United States Patent
Wu et al.

(10) Patent No.: US 9,171,364 B2
(45) Date of Patent: Oct. 27, 2015

(54) WAFER INSPECTION USING FREE-FORM CARE AREAS

(71) Applicant: KLA-Tencor Corporation, Milpitas, CA (US)

(72) Inventors: Kenong Wu, Davis, CA (US); Tao Luo, Fremont, CA (US); Lisheng Gao, Morgan Hill, CA (US); Eugene Shifrin, Sunnyvale, CA (US); Aravindh Balaji, Sunnyvale, CA (US)

(73) Assignee: KLA-Tencor Corp., Milpitas, CA (US)

( * ) Notice: Subject to any disclaimer, the term of this patent is extended or adjusted under 35 U.S.C. 154(b) by 86 days.

(21) Appl. No.: 14/168,011

(22) Filed: Jan. 30, 2014

(65) Prior Publication Data

US 2014/0376802 A1    Dec. 25, 2014

Related U.S. Application Data

(60) Provisional application No. 61/837,936, filed on Jun. 21, 2013, provisional application No. 61/913,380, filed on Dec. 8, 2013.

(51) Int. Cl.
*G06K 9/00* (2006.01)
*G06T 7/00* (2006.01)

(52) U.S. Cl.
CPC .............. *G06T 7/0004* (2013.01); *G06T 7/001* (2013.01); *G06T 2207/10061* (2013.01); *G06T 2207/30148* (2013.01)

(58) Field of Classification Search
CPC ... G06T 7/0004; G06T 7/0008; G06T 7/7001; G06T 2207/30148; H04N 7/18; H01L 27/0207; G01N 21/9501; G01N 21/64; G01N 21/94; G01N 21/95607
See application file for complete search history.

(56) References Cited

U.S. PATENT DOCUMENTS

| | | | |
|---|---|---|---|
| 6,347,150 B1 * | 2/2002 | Hiroi et al. | 382/149 |
| 7,570,796 B2 * | 8/2009 | Zafar et al. | 382/144 |
| 7,676,077 B2 * | 3/2010 | Kulkarni et al. | 382/144 |
| 2008/0094639 A1 | 4/2008 | Widmann et al. | |
| 2009/0290782 A1 | 11/2009 | Regensburger | |
| 2009/0324055 A1 | 12/2009 | Auerbach | |
| 2011/0142327 A1 | 6/2011 | Chen et al. | |
| 2011/0170091 A1 | 7/2011 | Chang et al. | |
| 2013/0070078 A1 * | 3/2013 | Takagi et al. | 348/80 |
| 2014/0105482 A1 * | 4/2014 | Wu et al. | 382/149 |
| 2014/0219544 A1 * | 8/2014 | Wu et al. | 382/149 |
| 2014/0376802 A1 * | 12/2014 | Wu et al. | 382/149 |
| 2015/0012900 A1 * | 1/2015 | Shifrin et al. | 716/112 |

OTHER PUBLICATIONS

International Search Report and Written Opinion for PCT/US2014/043473 mailed Oct. 21, 2014.

* cited by examiner

*Primary Examiner* — Amir Alavi
(74) *Attorney, Agent, or Firm* — Ann Marie Mewherter (57) ABSTRACT

Methods and systems for detecting defects on a wafer are provided. One method includes determining characteristics of care areas for a wafer based on wafer patterns. Determining the characteristics includes determining locations of care areas, identifying at least one pattern of interest (POI) in the wafer patterns for each of the care areas, allowing any of the care areas to have a free-form shape, allowing the care areas to be larger than frame images and selecting two or more POIs for at least one of the care areas. The method also includes searching for POIs in images generated for the wafer using an inspection system. In addition, the method includes detecting defects on the wafer by determining positions of the care areas in the images and applying one or more defect detection methods to the images based on the positions of the care areas in the images.

33 Claims, 6 Drawing Sheets

WAFER INSPECTION USING FREE-FORM CARE AREAS

This application claims benefit of 61/837,936 filed on Jun. 21, 2013 and claims benefit of 61/913,380 filed on Dec. 8, 2013.

BACKGROUND OF THE INVENTION

1. Field of the Invention

This invention generally relates to wafer inspection using free-form care areas.

2. Description of the Related Art

The following description and examples are not admitted to be prior art by virtue of their inclusion in this section.

Inspection processes are used at various steps during a semiconductor manufacturing process to detect defects on wafers. One important goal for any wafer inspection system is to suppress nuisance defects. Nuisance defects are those detected events which may not be relevant to semiconductor yields. Nuisance defects may be caused by wafer noise and system noise or are physical objects on the wafer. Nuisance defects may appear anywhere on a wafer. Some defects of interest (DOI) may appear only at certain locations on a wafer. Context information for a DOI may be used as prior knowledge for defect detection. Several approaches that use context information have been developed to detect defects. One such approach uses graphical data stream (GDS) data or design information to find hot spots where defects may occur at a higher probability and to inspect for defects around the hot spots.

There are, however, a number of disadvantages to such approaches. For example, for approaches that work with GDS data, GDS information may not be available in all circumstances such as for defect engineers in semiconductor fabrication plants. In addition, in order to detect defects with weak signal using the current approaches, huge amounts of nuisance defects may be detected. The defect signal may be defined as the maximum gray-level difference at defective pixels between an image with a defect and a reference image without the defect. The reference image is spatially-aligned with the defect image and may be acquired from neighboring dies or from multiple dies on the wafer. In all previous defect detection approaches, care areas are defined in terms of rectangles. Care areas are masks under which image pixels are inspected to detect defects. In some situations, DOIs are located along wafer structures which are not rectangular. If a care area with a rectangular shape is used to cover the DOI areas, extra pixels which may be nuisance sources will be inspected.

Accordingly, it would be advantageous to develop methods and/or systems for detecting defects on wafers that do not have one or more of the disadvantages described above.

SUMMARY OF THE INVENTION

The following description of various embodiments is not to be construed in any way as limiting the subject matter of the appended claims.

One embodiment relates to a computer-implemented method for detecting defects on a wafer. The method includes determining characteristics of care areas for a wafer based on wafer patterns. Determining the characteristics includes determining the care areas, identifying at least one pattern of interest (POI) in the wafer patterns for each of the care areas, allowing any of the care areas to have a free-form shape, selecting two or more POIs for at least one of the care areas, and allowing any of the care areas to be larger than any frame image. The method also includes searching for POIs in images generated for the wafer using an inspection system. In addition, the method includes detecting defects on the wafer by determining positions of the care areas in the images and applying one or more defect detection methods to the images based on the positions of the care areas in the images. The determining, searching, and detecting steps are performed using one or more computer systems.

The method described above may be performed as described further herein. In addition, the method described above may include any other step(s) of any other method(s) described herein. Furthermore, the method described above may be performed by any of the systems described herein.

Another embodiment relates to a non-transitory computer-readable medium storing program instructions executable on a computer system for performing a computer-implemented method for detecting defects on a wafer. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

An additional embodiment relates to a system configured to detect defects on a wafer. The system includes an inspection subsystem configured to generate images for a wafer. The system also includes a computer system configured for determining characteristics of care areas for the wafer based on wafer patterns, which includes determining the care areas, identifying at least one POI in the wafer patterns for each of the care areas, allowing any of the care areas to have a free-form shape, selecting two or more POIs for at least one of the care areas, and allowing any of the care areas to be larger than any frame image. The computer system is also configured for searching for POIs in images generated for the wafer using an inspection system. In addition, the computer system is configured for detecting defects on the wafer by determining positions of the care areas in the images and applying one or more defect detection methods to the images based on the positions of the care areas in the images. The system may be further configured as described herein.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In situations in which a wafer inspection system produces signals for defects of interest (DOIs) that are weaker than those generated for false (nuisance) defects appearing relatively close to DOI locations, overwhelming false defects are detected. Therefore, it is important to place care areas accurately to exclude noisy areas. Such "care areas" are each a set of connected image pixels where defect detection is performed (although other care areas can be defined to be areas on a wafer in which inspection has been selected to not be performed, which may also be referred to as "do not care areas").

Some inspection approaches such as target based inspection (TBI) are designed to detect defects effectively in these situations. For example, TBI has been developed to define micro care areas (MCAs) using templates for pattern search and performing accurate care area placement during wafer inspection. Defects detected by such approaches appear at certain isolated locations on the wafer. TBI may involve taking defect images such as user-specified defect images in their surroundings and defining patterns of interest (POIs), which can be used to uniquely locate nearby defects. "Templates" are images of POIs and are used to find potential defect locations on the wafer. Potential locations of the defects may be found in one die during setup and defect detection may be performed at potential defect locations on the whole wafer. The potential defect locations are delineated by care areas, defined by rectangular boxes, which define image pixels that are inspected by defect detection algorithm(s). TBI can be performed with any defect detection method(s) or algorithm(s) such as multi-die auto thresholding (MDAT), which is a defect detection method used by wafer inspection tools commercially available from KLA-Tencor, Milpitas, Calif., to detect defects with weak signals in repeating structures.

In this manner, TBI is a combination of localized defect inspection with substantially high sensitivity and image-based pattern search. Since TBI targets specific defects and locations, noise in other areas is excluded and the nuisance rate can be significantly reduced. With highly accurate care area placement and relatively small care areas, TBI can detect defects with substantially high sensitivity and substantially low nuisance rates.

However, in many situations in which the defects are located along a structure or in a structure transition area, such as the border between memory area and peripherals, current inspection cannot identify these structures uniquely. Care areas generated by such inspection are not flexible enough to cover the entire area efficiently. In contrast, the embodiments described herein detect DOIs and suppress nuisance events by using free-form care areas that may have irregular shapes and associating multiple POIs to one or more of the care areas. The shape of these care areas can adapt to the shape of wafer structures. These care areas can be placed substantially precisely.

One embodiment relates to a computer-implemented method for detecting defects on a wafer. The method includes determining characteristics of care areas for a wafer based on wafer patterns. Information for the wafer patterns may be acquired from a design for the wafer, and the design does not necessarily include the design data for the wafer. For example, in one embodiment, determining the characteristics of the care areas for the wafer based on the wafer patterns includes determining the characteristics of the care areas based on images of the wafer patterns acquired by imaging the wafer or another wafer with the inspection system. In this manner, information for the wafer patterns can be determined by imaging the design printed on a wafer and determining the information from the images. In one such example, relatively high resolution images of a wafer on which the design has been printed may be used to determine information for the wafer patterns included in the design for use in the embodiments described herein. Imaging the wafer or another wafer with the inspection system may be performed as described further herein.

Determining the characteristics of the care areas includes determining the care areas, identifying at least one POI in the wafer patterns for each of the care areas, allowing any of the care areas to have a free-form shape, selecting two or more POIs for at least one of the care areas, and allowing any of the care areas to be larger than any frame image. A wafer may be printed during a wafer fabrication process (e.g., lithography) with dies in a certain layout. In this manner, multiple dies are formed on a wafer and multiple POIs may be formed within each of the multiple dies. The POI may include only a few patterned features in the entire design for dies formed or to be formed on the wafer. In other words, a POI does not include the entire pattern for a die formed or to be formed on the wafer. In this manner, a POI has a width and a height that are shorter than a width and a height, respectively, of dies formed on the wafer. Different POIs may also have different dimensions from each other. For instance, since POIs may include different patterns, the POIs may have different dimensions that are determined based on the different patterns. Different POIs may be located in different positions in the dies.

In one embodiment, the free-form shape of one of the care areas is substantially the same as a shape of the wafer patterns included in the one of the care areas. In this manner, a care area can adapt to the shape of the structures in the design. The free-form shapes of the care areas may be defined using polyline definition.

In another embodiment, the free-form shape is not a rectangular shape. Therefore, the embodiments described herein provide a new care area definition. Currently used care areas are limited to rectangular shapes. More specifically, all care areas have been previously described in terms of a rectangle, a vertex plus width and height. Extra areas will be included in a care area if a rectangular area is used to cover a non-rectangular structure.

Figure 1:
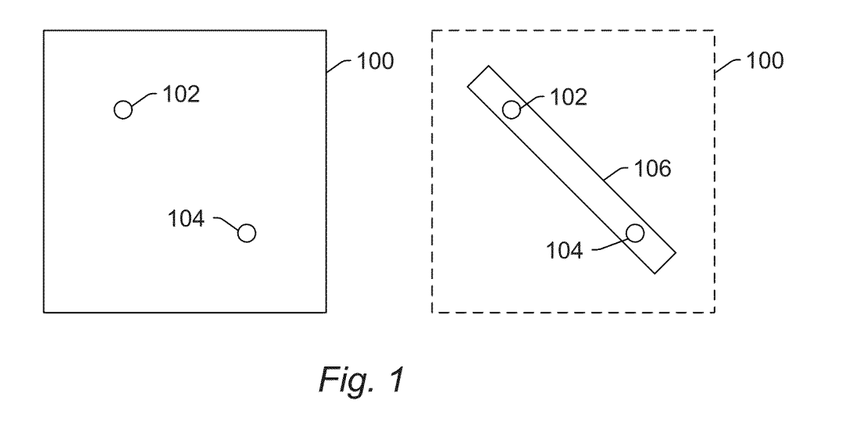
FIGS. 1-2, 4, and 6-7 are schematic diagrams illustrating plan views of various embodiments of care areas for a wafer determined according to various embodiments described herein.

In general, a POI is used to correct the care area position during inspection, and a care area indicates image pixels to be inspected. FIG. 1 illustrates the limitations of rectangular care areas. In this example, rectangular care area 100 may be generated and used to detect defects 102 and 104. If these are the only defects to be detected in the care area, all of the defects to be detected in the care area fall within diagonal line 106. Therefore, if a care area for defects 102 and 104 can be defined as diagonal line 106, then areas outside of diagonal line 106 can be eliminated from rectangular care area 100. As shown in FIG. 1, therefore, if defects only appear along the diagonal line, the rectangular care area includes extra areas. Nuisance defects can be detected in those extra areas. However, if the care area can be defined as the diagonal line shown in FIG. 1, that care area would be sufficient to detect the DOIs while eliminating more nuisance defects than the previously used rectangular care area.

In the embodiments described herein, a care area can have any two-dimensional (2D) shape that can be represented in a bitmap such as, for example, a line, polyline, polygon, curve, free-hand shape or drawing, or a combination thereof. A free-form care area provides maximum flexibility to inspect the area of interest and suppress the noise areas in a substantially effective way. Flexible care areas ultimately improve inspection sensitivity. Furthermore, although each of the care areas generated by the method is allowed to have a free-form shape, the care areas are not prevented from having a rectangular shape. For instance, for some care areas, a rectangular shape may be more appropriate than a non-rectangular shape while for other care areas for the same wafer, a non-rectangular shape may be the most effective for detecting DOI and suppressing or eliminating noise.

Figure 2:
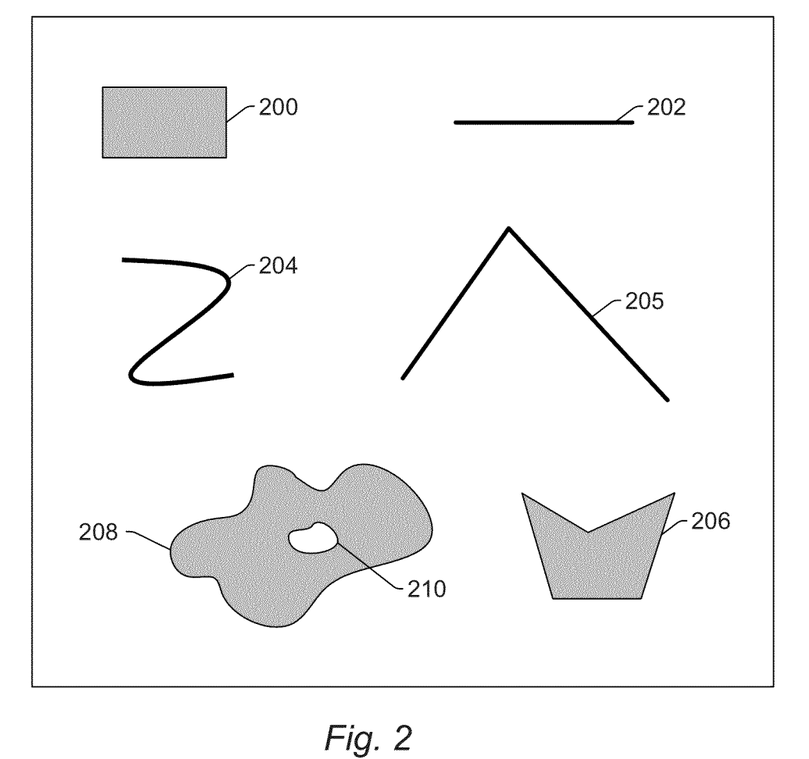

Various embodiments of care areas that may be defined in the embodiments described herein are shown in FIG. 2. As shown in FIG. 2, free-form care areas may be rectangular-shaped care areas such as care area 200, since the free-form care areas described herein are not prevented from being rectangular shaped. However, the free-form care areas described herein may also be straight line 202, arc- or curved-line 204, polyline 205, polygon care area 206, and irregular-shaped care area 208 that resembles and may even be a free-hand drawn shape. The straight lines, polylines and curves can have variable thickness. In addition, some of the free-form care areas may include areas that are not actually part of the care areas. In other words, the free-form care areas may be defined to surround non-care areas or different care areas. For example, as shown in FIG. 2, care area 208 surrounds area 210 that is not part of that care area and may instead be a do not care area or a different care area.

The care areas for a single wafer or a single wafer inspection recipe may include any combination of care area shapes. For example, one wafer inspection recipe may include definitions of characteristics for arc-shaped care areas as well as rectangular care areas. In other words, since each of the care areas is allowed to have a free-form shape, each care area may be defined to have any shape that can be adequately represented in the file format used for the wafer inspection recipe.

In some embodiments, determining the characteristics of the care areas includes storing one or more images of each of the at least one POI. For example, determining the characteristics of the care areas may include creating an image or a template for the POI. Determining the characteristics may also include modifying the template by changing the size of the template or flipping, rotating, or processing the template. The template shape may be a square or rectangle and its size may be smaller than the image acquired by an inspection system. In addition, different templates may be grabbed, acquired, or generated for different parameters of the inspection system (such as optics mode, pixel size, wafer orientation, etc.) that will use the templates. In other words, the template for the POI may be dependent upon parameters of the inspection system.

In another embodiment, determining the characteristics of the care areas includes identifying a position of each of the at least one POI with respect to its corresponding care area. The POI positions are saved and will be used during defect detection as described further herein. The embodiments described herein define and utilize a relationship between POIs and care areas. For example, as described further herein, the POI is selected to be a wafer pattern that can be identified uniquely. The image of the POI is called a template that is used to search for POI locations. During setup, each POI is searched for independently. POI locations found are stored in the inspection recipe. The relative spatial relationship between a POI and a care area is fixed. Therefore, given a POI location, the care area position can be uniquely determined. The POI position(s) relative to the care area location (and possibly noise box position relative to the care area) may be determined in setup and stored for use during inspection.

In one embodiment, each of the at least one POI is associated with only one of the care areas. Each care area may also be assigned a care area ID. Each POI may be assigned a care area ID indicating that this care area "owns" this POI. The care area or care area group IDs may have a unique correspondence to their associated target IDs (or DOI IDs). In other words, each care area or care area group may be assigned an ID that is uniquely associated with the target or DOI to which it corresponds. The POI and care area locations and any other information may also be stored with their associated template images and care area or care area group ID.

The POI(s) associated with care areas preferably have unique templates. For example, in one embodiment, identifying the at least one POI includes identifying one or more POIs that are unique within a portion of the images corresponding to their respective care areas. In another embodiment, identifying the at least one POI includes identifying one or more POIs that are unique from each other. In one such example, identifying the at least one POI includes determining a uniqueness of a potential POI relative to other patterns proximate to the potential POI (i.e., the uniqueness of the potential POI with respect to its surroundings). A correlation value between images from one die and another die used for POI search may be calculated and saved for POI search. A metric that measures uniqueness of the POI may be calculated. For example, the ratio of the second highest and highest peak values among correlation values for all locations in the image can be used as the uniqueness metric. The user can adjust the POI location according to the uniqueness value. In another example, identifying the at least one POI may include determining if a template for the POI correlates with different portions of the image of the die. For instance, an inspection system may be used to grab images for an entire die and run a correlation (such as a normalized cross correlation (NCC)) between the template and images to search for the POI locations.

In some embodiments, identifying the at least one POI includes identifying one or more POIs that are asymmetric. For example, the POI(s) selected for a care area preferably have non-symmetric structure(s). Selecting POIs that have asymmetric structures enables the locations of the POIs in the output to be more easily determined with higher accuracy using the methods described herein such as template matching. In addition, asymmetric POIs are required for rotated and flipped POIs and care areas. More specifically, asymmetric POIs will look differently after rotation or flipping; symmetric ones will be impossible to distinguish. The POIs may be asymmetric in one or two dimensions (i.e., the x- and/or y-directions).

Figure 3:
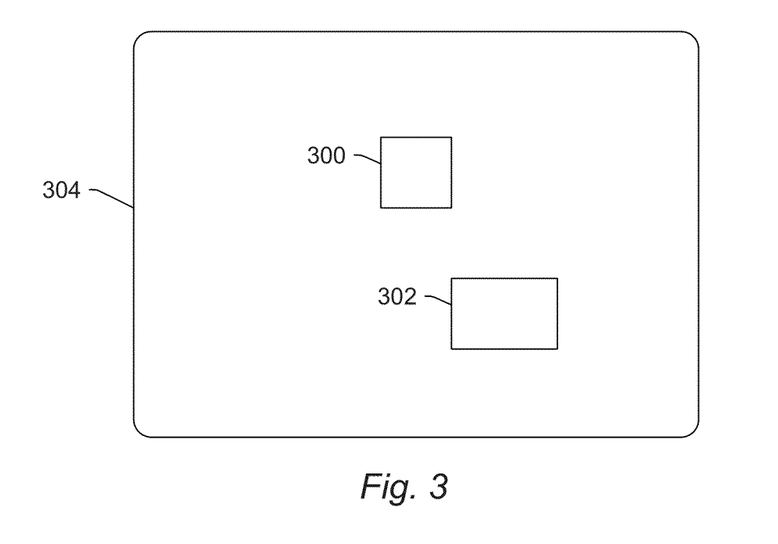
FIGS. 3 and 5 are schematic diagrams illustrating plan views of various examples of previously used care areas for a wafer.
Figure 4:
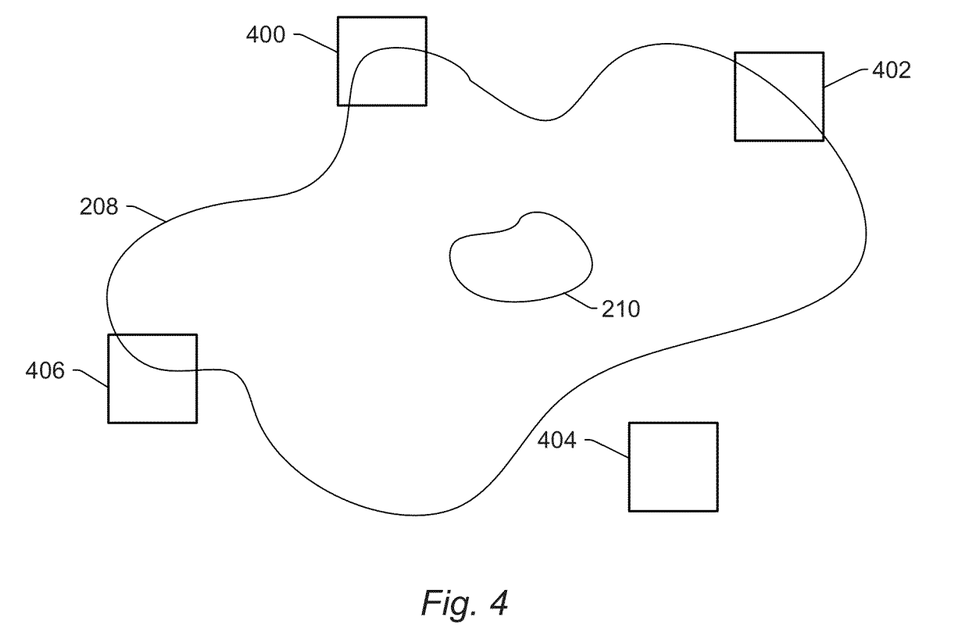

For previously used care areas, only one POI was selected for each care area. For example, as shown in FIG. 3, for care area 300, only one POI 302 would have been selected within area 304 surrounding the care area. However, as described further herein, two or more POIs may be selected for at least one of the care areas. In addition, two or more POIs may be selected for any of the care areas. In this manner, multiple POIs may be associated with any of the care areas. In one such example, as shown in the embodiment of FIG. 4, multiple POIs 400, 402, 404 and 406 may be selected for care area 208 that was previously described with respect to FIG. 2. As shown in FIG. 4, the POIs are spaced from each other and spread across the area within and surrounding the care area. The POIs shown in FIG. 4 and their locations with respect to the care area may be selected as described further herein. For instance, the POIs may be selected based on the characteristics of the POIs (e.g., uniqueness) and their positions with respect to the care area such that they can improve the care area location determination and can be used to determine the care area location across multiple images.

Each of the POIs may be located on an end or a corner portion of the care area. In addition, each of the POIs may at least partially overlap with the care area. Furthermore, each of the POIs may be located within a care area. Any of the POIs may have any other spatial relationship with the care area. For example, the POIs may include some POIs that do not overlap with the care area and/or some POIs that are located outside of the care area.

In an additional embodiment, identifying the at least one POI includes selecting the two or more POIs for the at least one of the care areas such that each of the two or more POIs can be used independently of each other to determine the position of the at least one of the care areas in the images. For example, each care area can be associated with multiple POIs. In other words, multiple POIs can be associated with the same care area. Each POI can independently define the position of the care area associated with the POI. Multiple POIs provide redundancy to thereby reduce the number of dropped care areas. For example, associating multiple POIs with the same care area increases the care area coverage for different frame image layouts. A wafer image is divided into multiple frame images on which defect detection is performed. In other words, multiple POIs may be defined for the same care area to increase the care area coverage during a scan. In addition, in some inspection methods, if a POI is not found because of unresolved patterns, the care area cannot be defined. However, in the embodiments described herein, the care area can be defined as long as one of multiple POIs selected for the care area is found. This improves the reliability of defect location identification.

In another embodiment, the two or more POIs selected for the at least one of the care areas are selected such that when the at least one of the care areas spans two or more of the frame images for the wafer, at least one of the two or more POIs is present in each of the two or more images. For example, in some currently used inspection methods, only one POI is associated with a care area so that the size of the care area is limited. If the care area is relatively large, the care area may be included in multiple images generated for the wafer. If there is no POI in an image, the position of the portion of the care area in that image cannot be identified and inspection cannot be performed for that portion of the care area. Therefore, it is desirable to use multiple POIs that are spread apart from each other according to the shape of the care area. In this manner, if a care area is included in multiple images, the different POIs can be spread into different images. Each POI in an image can be used to correct the portion of the care area in that image. In this way, most portions of care areas can be inspected.

The idea of multiple POIs associated with one care area significantly increases the inspectable area compared to previously used care area definitions. For example, in previously used methods, only one POI is associated with one care area. If a portion of a care area is in a frame image that does not contain any POI, this portion of the care area cannot be inspected. (A frame image can be generally defined as the basic unit that a detection method or algorithm works on.) This is because a POI defines the care area position. Therefore, the care area cannot be too large and extend to another image that does not contain any POI. With multiple POIs for one care area, POI locations can be chosen based on the care area layout. In this manner, the POI locations can be chosen such that it is likely that POIs are spread into different images if the care area is covered by different images. Multiple POIs allow inspection to use larger care areas.

Figure 5:
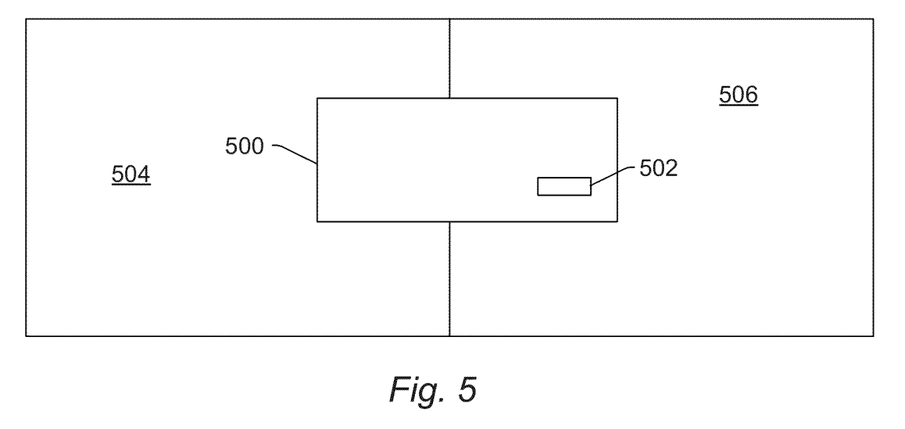

FIG. 5 illustrates one example of a previously used care area and how its size limits its performance. In particular, care area 500 is a relatively large care area for which POI 502 has been selected. As shown in FIG. 5, care area 500 spans two different frame images, frame image 504 and frame image 506. Therefore, the relatively large care area is covered by two relatively large frame images. Since the POI is located in frame image 506 and since frame images are separately processed in defect detection, the portion of the care area in frame image 504 cannot be identified because there will not be any POI in that frame image. In this manner, pixels within that portion of the care area (the portion in frame image 504) cannot be inspected.

Figure 6:
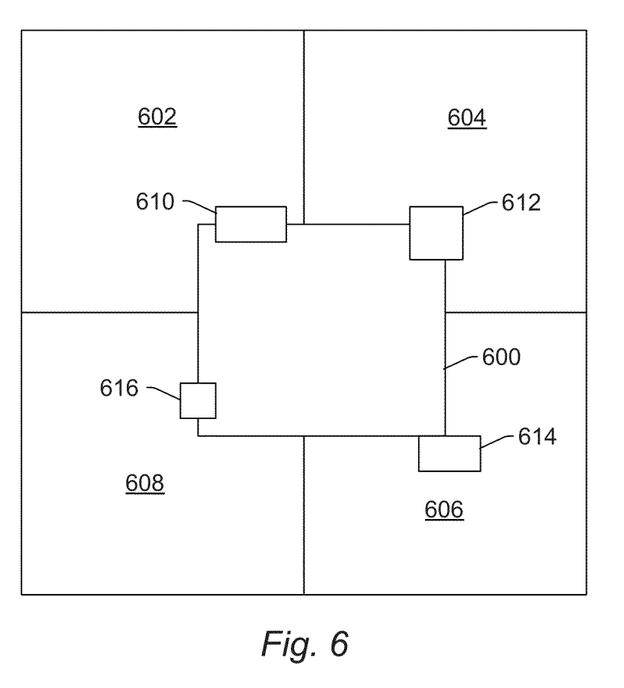

In contrast, in the embodiments described herein, the POIs for care area 600 shown in FIG. 6 may be selected such that if the care area is split into any of four frame images 602, 604, 606, and 608, each image contains a POI. In particular, four POIs 610, 612, 614, and 616 are selected such that if the care area is split into the four frame images shown in FIG. 6, four POIs 610, 612, 614, and 616 are located in images 602, 604, 606, and 608, respectively. In this manner, all pixels in the care area can be inspected because the location of any portion of the care area in any of the four frame images can be determined using one of the POIs. In this manner, using multiple POIs for one care area helps inspection to use relatively large care areas. In general, multiple POIs may be selected near corners or other extremities of care areas and/or spaced as far apart from each other as possible to ensure that regardless of how the care area is positioned with respect to the frame images, each frame image contains a POI.

In one such embodiment, when the at least one of the care areas spans the two or more images, the at least one of the care areas is split across the two or more images in an x-direction on the wafer, a y-direction on the wafer, or x- and y-directions on the wafer. For example, the care area may be big enough to cross two or more frame images along x- and/or y-directions. In one such example, as shown in FIG. 6, care area 600 is split into four frame images, two in the x-direction and two in the y-direction. How the care area will be split or not split across frame images will depend on both the characteristics of the care area and the frame image layout defined for specific wafer inspection.

The method may also include generating images for the wafer using an inspection system, which may be configured as described further herein. Generating the images may be performed as described further herein. The images may include images, image data, signals, or any other output that can be generated by a wafer inspection system.

The method also includes detecting defects on the wafer by determining positions of the care areas in the images and applying one or more defect detection methods to the images based on the positions of the care areas in the images. Determining the characteristics of the care areas, searching for POIs in images generated for the wafer using an inspection system, and detecting the defects are performed using one or more computer systems, which may be configured as described further herein.

As described further above, in some embodiments, determining the characteristics includes storing one or more images of each of the at least one POI. In some such embodiments, determining the positions of the care areas in the images for the wafer includes determining a position of each of the at least one POI in the images for the wafer. For example, the position of each of the at least one POI may be determined using template matching (i.e., matching the template for the POI to the images generated for the wafer). The position of each POI may then be determined as the position of the portion of the images to which its template matches. In addition, during a detection scan, template matching may be performed for all POIs belonging to the same care area. The position of the care area may then be determined based on the spatial relationship(s) between the care area and its POI(s) that was or were determined during setup. In this manner, the position of the care areas in the images may be determined based on the position(s) of one or more of their POIs in the images and the care area offset(s) to the POI(s).

In one embodiment, when the at least one of the care areas spans the two or more images, determining the positions of the care areas includes determining a position of a first portion of the at least one of the care areas in a first of the two or more images based on any of the two or more POIs located in the first of the two or more images and determining a position of a second portion of the at least one of the care areas in a second of the two or more images based on any of the two or more POIs located in the second of the two or more images. As described above, if a care area is included in multiple images, different POIs for the care area will have preferably been selected as described herein such that the different POIs are spread into different images. During a detection scan, only the POIs which are associated with a care area and found in a frame image during setup may be searched for in this frame image. In this manner, all the in-frame POIs associated with the same care area may be found. If not all of the POIs associated with a care area can be found in the same frame image or if only a portion of a care area can be aligned with the frame image, frame images acquired at adjacent locations on the wafer may be searched for the POIs that were not found in the first frame image. Each POI in an image can be used to correct the portion of the care area in that image. If a partial care area is inside a frame image, the partial care area can be used to perform detection in the corresponding frame image. For example, if any POI(s) associated with a care area is/are found in a frame image and part of the care area is inside the frame image, the partial care area can be used for detection. In this way, most portions of the care area can be inspected.

In some embodiments, determining the positions of the care areas includes identifying positions of the at least one POI in the images for the wafer and determining the positions of the care areas in the images for the wafer based on the positions of the at least one POI in the images for the wafer. For example, during a detection scan, when a POI has been found in an image, the template ID of the POI may be used to acquire, determine, or construct the care area associated with that POI based on the template ID. The templates for other POIs associated with that care area may be determined or acquired. Based on characteristics for the care area, the location of POI already found in the image, and the POI offsets to the care area, a template search may be performed for all POIs associated with the care area. A template matching score may be determined as the maximum template matching result among all the POIs. If the template matching score is beyond a recipe threshold for the score, the offsets for the care area may be determined using the best matched POI. The care area may then be adjusted using those offsets. Regardless of how the POI locations in the images are identified, once the POI locations have been determined, those locations in combination with the spatial relationship between the POI and the care area can be used to determine the position of the care area in the images.

In another embodiment, determining the positions of the care areas includes matching images of the at least one POI with the images for the wafer and, for the at least one of the care areas, identifying which of the two or more POIs has a best result for the matching and determining the position of the at least one of the care areas with the POI having the best result. For example, during inspection, POIs associated with the same care area ID may be searched. If multiple POIs are found for one care area, the POI with the highest search score may be used to correct the care area position. In this manner, during a detection scan, the best matched POI may be found. In one such example, if multiple POIs associated with the same care area are found in a frame image, the POI with the highest NCC value may be used to calculate the offset of the care area, and the noise box associated with that POI may be used to calculate the noise.

Different care areas may be generated for different parameters of the inspection system (such as optics mode, pixel size, wafer orientation, etc.) that will be used for generating the images of the wafer. Similarly, different patch image(s) under a care area may be generated or acquired for different parameters such as those described above of the inspection system. Patch image(s) under a care area may be acquired during recipe setup. The patch images may be images within a rectangle underneath the care area. In other words, the patch images may be rectangular images that are underneath and therefore encompass the care area. Care area IDs that have a unique correspondence to the patch images may be stored and later used by an inspection recipe.

Applying one or more defect detection methods to the images based on the positions of the care areas in the images may be performed in any suitable manner. Defect detection may be performed for those pixels within care areas. Alternatively, the care areas can be treated as "do not care areas," and the pixels in such "do not care areas" are not inspected. Applying the defect detection method(s) may include generating difference images using the images of the care areas and a reference image, calculating a noise measure and a threshold, and applying a threshold to signals in the difference images. Any signals in the difference image above the threshold may be identified as a defect or a potential defect. In this manner, a defect may be detected by comparing its magnitude to its surrounding noise, where the magnitude is defined as the intensity difference between a test image and a reference image at the corresponding enabled pixels. Noise may be estimated from the care area, or dilated care area or a rectangular box centered on (or near) the potential defect location, and the noise factor may be a user-defined threshold. In addition, applying the defect detection method(s) may include determining one or more characteristics of difference images and applying a threshold to one or more values of the one or more characteristics of the difference images.

The reference image may be, for example, an image of the care area in which defects have not been detected, a median image of multiple dies, or a template acquired at setup. For example, the reference image may be a template for the POI or the care area. In this manner, the reference image may not be an image acquired during inspection. In other words, the reference image is not limited to an image acquired during inspection. Defect detection performed in the embodiments described herein may also be a single detection scheme or a double detection scheme (in which two reference images are used for a single test image).

The defect detection method(s) that are applied to the images for each of the care area types may be the same or different. For example, the care areas may be grouped by type, the same defect detection methods may be applied to the care areas in the same group, and different defect detection methods may be applied to the care areas in different groups. In some instances, the method may include determining one or more detection parameters separately for each care area type based on images for each care area type, respectively. In addition, since the methods can be used for different types of care areas, different thresholds can be used for detecting defects in different types of care areas. For instance, a first threshold may be used for detecting a first known DOI in a first type of care area, and a second, different threshold may be used for detecting a second, different known DOI in a second, different type of care area.

Furthermore, the detection parameter(s) of the defect detection method(s) used to detect defects in each of the care areas may be the same or different. For example, the method may include determining the defect detection method(s) and/or detection parameter(s) separately for each of the care areas based on the images of the care areas, respectively. In this manner, the defect detection method(s) and/or detection parameter(s) may be determined on a care area-by-care area basis.

Figure 7:
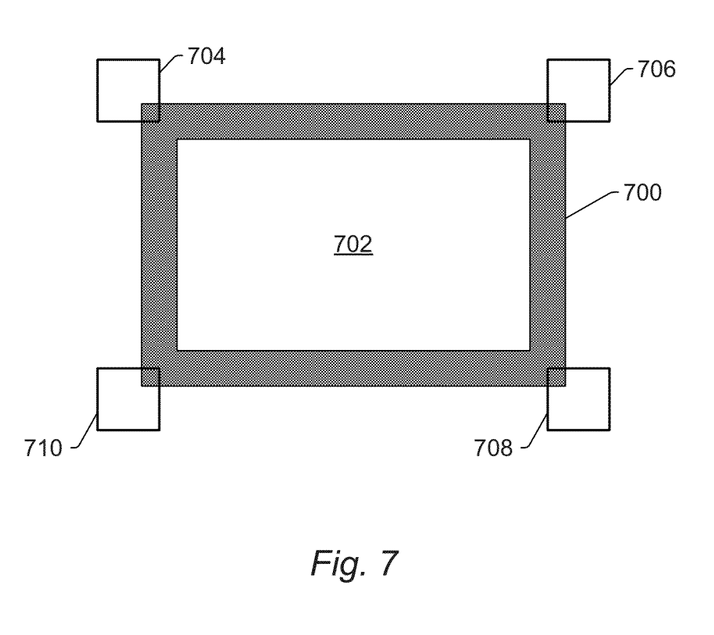

In some embodiments, applying defect detection method(s) to the images includes detecting defects in one or more of the care areas based on the position(s) of the care area(s). Noise statistics may be calculated to estimate the noise level surrounding the care areas. Noise statistics indicate the normal pixel behavior. Defective pixels show different behavior from noise. All pixels in the care areas may be compared to the noise statistics to determine whether some of the pixels belong to defects. Noise statistics for a care area may be calculated from the care area and its surrounding areas. For example, as shown in FIG. 7, the noise statistics may be determined using pixels inside dilated care area 700 generated for care area 702. If the number of pixels in the care area and surrounding areas is not enough for calculating statistics reliably, the pixels inside the POIs for the care area can be added into the noise calculation. In this manner, pixels in the noise boxes may be used together with the pixels in the dilated care area to calculate the noise statistics. For example, if the number of pixels in dilated area 700 for care area 702 is not sufficient for calculating the noise statistics, the pixels inside the POIs 704, 706, 708, and 710 may be used for calculating the noise.

One or more parameters of the defect detection method(s) or algorithm(s) may be noise adaptive. That is, if noise is relatively high in the images, the inspection sensitivity may be set relatively low. Otherwise, the inspection sensitivity may be set relatively high. The inspection sensitivity may be set relatively low by selecting a relatively high threshold that is applied to difference images. In contrast, the inspection sensitivity may be set relatively high by selecting a relatively low threshold that is applied to difference images.

Although some specific embodiments and examples of how defect detection methods can be applied to the images based on the positions of the care areas in the images are described herein, it is to be understood that once the positions of the care areas in the images have been determined as described herein, any defect detection method or algorithm that can be used or adapted to performing defect detection based on care areas can be used for detecting the defects. In other words, the care areas described herein are not defect detection method or algorithm specific.

In one embodiment, none of the steps of the method are performed using design data for the wafer or the other wafer. In other words, design data for the wafer or the other wafer is not required for any step of the method. Therefore, the embodiments described herein are advantageous in that they do not require design data. Instead, inspection images other than GDS information can be used for the wafer design. As such, GDS availability is not an issue. In contrast, methods that use hot spots for wafer inspection require design data in order to be performed. Such methods sometimes also need support from someone (e.g., a customer) with design knowledge. However, since the embodiments described herein do not require any design data, any user can perform the inspection, which is a significant advantage particularly since the design data may not be available in all instances.

Figure 8:
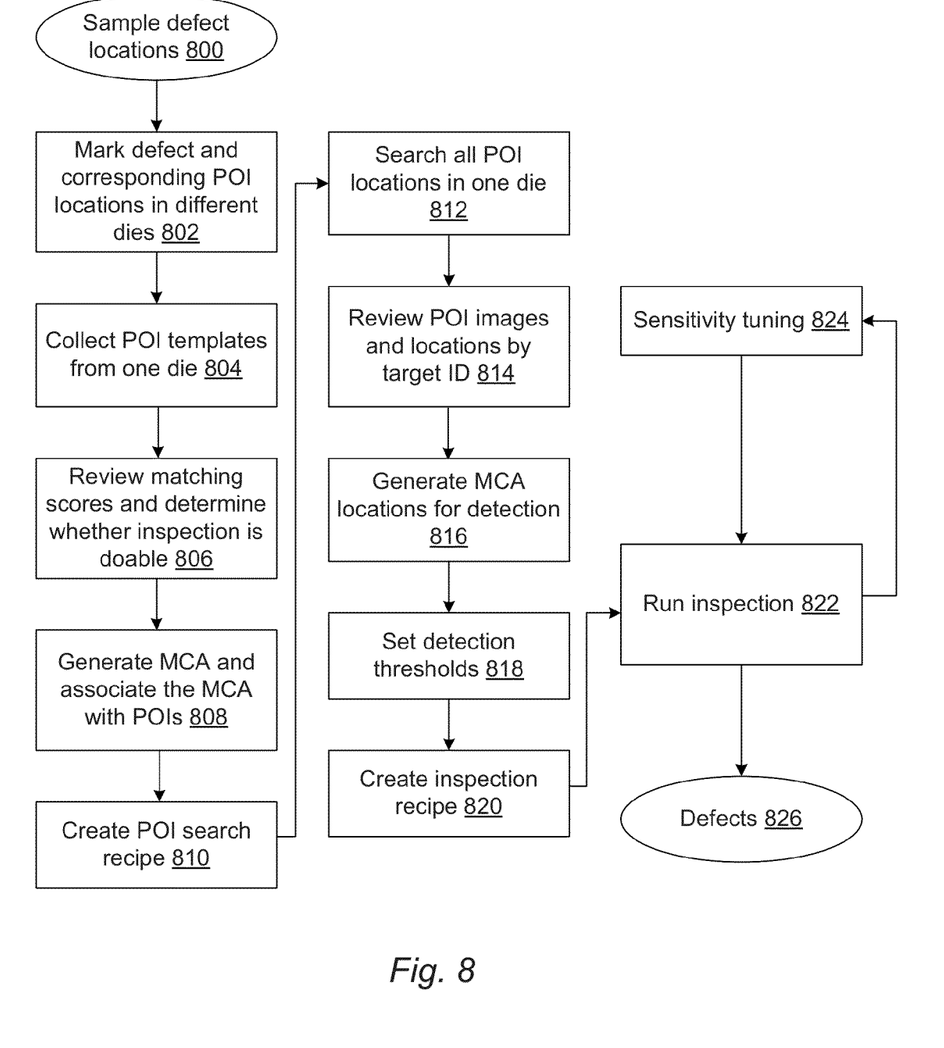
FIG. 8 is a flow chart illustrating one embodiment of a method for detecting defects on a wafer.

FIG. 8 illustrates one particular embodiment of the methods described above. The embodiment shown in FIG. 8 may include fewer than all of the steps shown in FIG. 8 and would still be within the scope of the embodiments described herein. In addition, additional steps described herein may be added to the method shown in FIG. 8. Furthermore, the steps shown in FIG. 8 may not necessarily have to be performed in the order shown in FIG. 8, and the method would still be within the scope of the embodiments described herein.

As shown in step 800 of FIG. 8, the method includes acquiring sample defect locations. The sample defect locations can be acquired from a system other than the one that will be inspecting wafers for the defects. For example, a defect review system such as a scanning electron microscope (SEM) may be used to identify DOI on a wafer and to determine locations of the DOI on the wafer. Those defect locations can be acquired from that other system. However, the defect locations can also be acquired from a storage medium (e.g., a fab database) in which another system has stored the defect locations. In another example, the sample defect locations can be acquired using the inspection system that will be used to inspect the wafer. For example, a test inspection may be performed on a limited portion of the wafer with substantially high sensitivity to thereby identify any DOI that are occurring on the wafer and that may be desirable to detect by the inspection.

The method shown in FIG. 8 also includes marking defect and corresponding POI locations in different dies, as shown in step 802, which may be performed in any suitable manner. The method shown in FIG. 8 further includes collecting POI templates from one die on the wafer, as shown in step 804. This die is referred to as the reference die. The POI templates may be collected as described further herein. Template matching is performed between the template and the image acquired from the reference die. In addition, the method shown in FIG. 8 includes reviewing the matching scores (e.g., NCC scores) and determining whether inspection is doable, as shown in step 806. For example, the matching scores may be reviewed to determine if the POI templates can be matched to within (or above) some certainty. Therefore, reviewing the matching scores may essentially determine if the POIs for which the templates were collected are usable for the inspection described herein. If one or more of the POI templates do not have sufficient matching scores, the method may include searching the wafer patterns for other POIs to use in place of those with insufficient matching scores.

The method shown in FIG. 8 also includes generating micro care areas (e.g., MCAs) and associating the MCA with the corresponding POIs, as shown in step 808, which may be performed as described further herein. In addition, the method shown in FIG. 8 includes creating a POI search recipe, as shown in step 810. Creating the POI search recipe may be performed in any suitable manner and may have any suitable recipe format.

The method shown in FIG. 8 further includes searching all POI locations in one die, as shown in step 812. Searching all POI locations in one die may be performed in any suitable manner. The method shown in FIG. 8 may also include reviewing POI images and locations by target ID, as shown in step 814, which may be performed as described herein. POI search may find wafer patterns which are different from the POI. The review process allows users to remove these patterns. These patterns are not interesting because they are not POIs and cannot be used to determine the locations of care areas. In addition, the method shown in FIG. 8 includes generating MCA locations for detection, as shown in step 816, which may be performed as described herein.

As shown in step 818 of FIG. 8, this method includes setting detection thresholds, which may be performed as described herein. The method further includes creating an inspection recipe, as shown in step 820 of FIG. 8, which may be performed in any suitable manner. The inspection recipe may include (or include reference to) the detection thresholds set in step 818, the MCA locations generated in step 816, the MCA generated in step 808, and any other information generated by the methods described herein. The inspection recipe may be generated in any suitable inspection recipe file format and may be stored in any suitable storage medium that is accessible by the inspection system.

As shown in step 822 of FIG. 8, the method includes running inspection, which is preferably performed using the inspection recipe created in step 820. Results of the inspection may be provided to sensitivity tuning step 824, which may include examining the results of the inspection to determine if the defects were detected at the expected DOI locations. If the defects were not detected as expected at the DOI locations, this step may adjust the sensitivity of the inspection by changing one or more of the detection thresholds set in step 818. This tuning step may also include reviewing the nuisance defects detected by inspection. If the nuisance count is larger than an expected number, the sensitivity parameters may be adjusted to reduce the nuisance count. Steps 822 and 824 may be performed iteratively until satisfactory defects 826 have been detected by the inspection. The inspection recipe created in step 820 may then be updated with the detection settings determined by the sensitivity tuning step. The updated inspection recipe may then be used for a wafer inspection.

Each of the embodiments of the method described above may include any other step(s) of any other method(s) described herein. Furthermore, each of the embodiments of the method described above may be performed by any of the systems described herein.

All of the methods described herein may include storing results of one or more steps of the method embodiments in a non-transitory computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method detects the defects, the method may include storing information about the detected defects in a storage medium.

Figure 9:
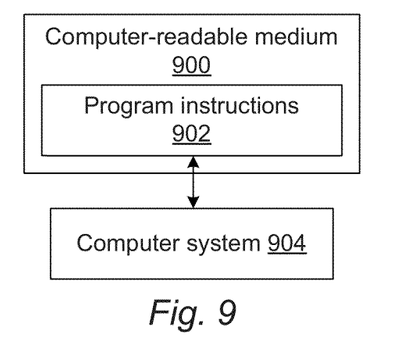
FIG. 9 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for detecting defects on a wafer. One such embodiment is shown in FIG. 9. In particular, as shown in FIG. 9, non-transitory computer-readable medium 900 includes program instructions 902 executable on computer system 904. The computer-implemented method includes the steps of the method described above. The computer-implemented method for which the program instructions are executable may include any other step(s) described herein.

Program instructions 902 implementing methods such as those described herein may be stored on computer-readable medium 900. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing and software, either as a standalone or a networked tool.

Figure 10:
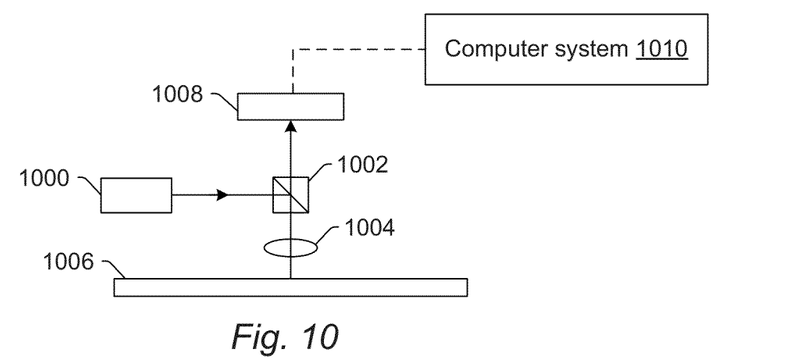
FIG. 10 is a schematic diagram illustrating a side view of one embodiment of a system configured to detect defects on a wafer.

Another embodiment relates to a system configured to detect defects on a wafer. One embodiment of such a system is shown in FIG. 10. The system includes an inspection subsystem configured to generate images for a wafer. The inspection subsystem may include any suitable inspection subsystem such as an e-beam inspection subsystem. Examples of suitable e-beam inspection subsystems include those that are included in commercially available e-beam inspection tools such as the eSxxx tools from KLA-Tencor, Milpitas, Calif. Alternatively, the inspection subsystem may include an optical inspection subsystem, which may have a configuration as described herein. The inspection systems may have single collection channel or multiple collection channels.

The images may include any suitable data, image data, signals or image signals. The inspection subsystem may generate the images for the wafer as described further herein. The images for the wafer may include any other information described herein.

As shown in FIG. 10, the inspection subsystem includes light source 1000. Light source 1000 may include any suitable light source known in the art such as a laser or broad band light source. Light source 1000 is configured to direct light to beam splitter 1002, which is configured to reflect the light from light source 1000 to refractive optical element 1004. Refractive optical element 1004 is configured to focus light from beam splitter 1002 to wafer 1006. Beam splitter 1002 may include any suitable beam splitter such as a 50/50 beam splitter. Refractive optical element 1004 may include any suitable refractive optical element, and although refractive optical element 1004 is shown in FIG. 10 as a single refractive optical element, it may be replaced with one or more refractive optical elements and/or one or more reflective optical elements.

Light source 1000, beam splitter 1002, and refractive optical element 1004 may, therefore, form an illumination subsystem for the inspection subsystem. The illumination subsystem may include any other suitable elements (not shown in FIG. 10) such as one or more polarizing components and one or more filters such as spectral filters. As shown in FIG. 10, the light source, beam splitter, and refractive optical element are configured such that the light is directed to the wafer at a normal or substantially normal angle of incidence. However, the light may be directed to the wafer at any other suitable angle of incidence. The inspection subsystem may be configured to scan the light over the wafer in any suitable manner.

Light reflected from wafer 1006 may be collected by refractive optical element 1004 and may be directed through beam splitter 1002 to detector 1008. Therefore, the refractive optical element, the beam splitter, and the detector may form a detection subsystem of the inspection subsystem. The detector may include any suitable imaging detector known in the art such as a charge coupled device (CCD). The detection subsystem may also include one or more additional components (not shown in FIG. 10) such as one or more polarizing components, one or more spatial filters, one or more spectral filters, and the like. Detector 1008 is configured to generate an image that is responsive to the reflected light detected by the detector.

The system also includes computer system 1010 configured for determining characteristics of care areas for the wafer based on wafer patterns. Determining the characteristics includes determining the care areas, identifying at least one POI in the wafer patterns for each of the care areas, allowing any of the care areas to have a free-form shape, selecting two or more POIs for at least one of the care areas, and allowing any of the care areas to be larger than any frame image. The computer system may determine the defect and care area characteristics as described further herein. The computer system may search for POIs in images generated for the wafer using the inspection subsystem. The computer system is also configured for detecting defects on the wafer by determining positions of the care areas in the images and applying one or more defect detection methods to the images based on the positions of the care areas in the images. The computer system may be configured to detect the defects and apply the defect detection method(s) as described further herein. In addition, the computer system may be configured to perform any other step(s) described herein.

Images generated by the detector may be provided to computer system 1010. For example, the computer system may be coupled to the detector (e.g., by one or more transmission media shown by the dashed lines in FIG. 10, which may include any suitable transmission media known in the art) such that the computer system may receive the images generated by the detector. The computer system may be coupled to the detector in any suitable manner. The computer system may be further configured as described herein. The inspection subsystem may also be further configured as described herein. Furthermore, the system may be further configured as described herein.

It is noted that FIG. 10 is provided herein to generally illustrate one configuration of an inspection subsystem that may be included in the system embodiments described herein. Obviously, the inspection subsystem configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the 28XX, 29XX, and Puma 9XXX series of tools that are commercially available from KLA-Tencor. For some such systems, the methods described herein may be provided as optional functionality of the system (e.g., in addition to other functionality of the system). Alternatively, the system described herein may be designed "from scratch" to provide a completely new system.

Although the inspection subsystem is described above as a bright field (BF) inspection subsystem, it is to be understood that the inspection subsystem may also or alternatively be configured as a dark field (DF) inspection subsystem (i.e., an inspection subsystem configured to detect defects using scattered light).

Further modifications and alternative embodiments of various aspects of the invention will be apparent to those skilled in the art in view of this description. For example, methods and systems for detecting defects on a wafer are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for detecting defects on a wafer, comprising:
   determining characteristics of care areas for a wafer based on wafer patterns, wherein determining the characteristics comprises determining the care areas, identifying at least one pattern of interest in the wafer patterns for each of the care areas, allowing any of the care areas to have a free-form shape, selecting two or more patterns of interest for at least one of the care areas, and allowing any of the care areas to be larger than any frame image;
   searching for patterns of interest in images generated for the wafer using an inspection system; and
   detecting defects on the wafer by determining positions of the care areas in the images and applying one or more defect detection methods to the images based on the positions of the care areas in the images, wherein said determining, said searching, and said detecting are performed using one or more computer systems.

2. The method of claim 1, wherein the free-form shape of one of the care areas is substantially the same as a shape of the wafer patterns included in the one of the care areas.

3. The method of claim 1, wherein the free-form shape is not a rectangular shape.

4. The method of claim 1, wherein determining the characteristics of the care areas for the wafer based on the wafer patterns comprises determining the characteristics of the care areas based on images of the wafer patterns acquired by imaging the wafer or another wafer with the inspection system.

5. The method of claim 1, wherein determining the characteristics further comprises storing one or more images of each of the at least one pattern of interest, and wherein determining the positions of the care areas in the images for the wafer comprises determining a position of each of the at least one pattern of interest in the images for the wafer.

6. The method of claim 1, wherein said determining the characteristics further comprises identifying a position of each of the at least one pattern of interest with respect to its corresponding care area.

7. The method of claim 1, wherein each of the at least one pattern of interest is associated with only one of the care areas.

8. The method of claim 1, wherein identifying the at least one pattern of interest comprises identifying one or more patterns of interest that are unique within a portion of the images corresponding to their respective care areas.

9. The method of claim 1, wherein identifying the at least one pattern of interest comprises identifying one or more patterns of interest that are unique from each other.

10. The method of claim 1, wherein identifying the at least one pattern of interest comprises identifying one or more patterns of interest that are asymmetric.

11. The method of claim 1, wherein said identifying the at least one pattern of interest comprises selecting the two or more patterns of interest for the at least one of the care areas such that each of the two or more patterns of interest can be used independently of each other to determine the position of the at least one of the care areas in the images.

12. The method of claim 1, wherein the two or more patterns of interest selected for the at least one of the care areas are selected such that when the at least one of the care areas spans two or more of the images for the wafer, at least one of the two or more patterns of interest is present in each of the two or more images.

13. The method of claim 12, wherein when the at least one of the care areas spans the two or more images, determining the positions of the care areas comprises determining a position of a first portion of the at least one of the care areas in a first of the two or more images based on any of the two or more patterns of interest located in the first of the two or more images and determining a position of a second portion of the at least one of the care areas in a second of the two or more images based on any of the two or more patterns of interest located in the second of the two or more images.

14. The method of claim 12, wherein when the at least one of the care areas spans the two or more images, the at least one of the care areas is split across the two or more images in an x-direction on the wafer, a y-direction on the wafer, or x- and y-directions on the wafer.

15. The method of claim 1, wherein determining the positions of the care areas comprises identifying positions of the at least one pattern of interest in the images for the wafer and determining the positions of the care areas in the images for the wafer based on the positions of the at least one pattern of interest in the images for the wafer.

16. The method of claim 1, wherein determining the positions of the care areas comprises matching images of the at least one pattern of interest with the images for the wafer and, for the at least one of the care areas, identifying which of the two or more patterns of interest has a best result for said matching and determining the position of the at least one of the care areas with the pattern of interest having the best result.

17. A non-transitory computer-readable medium, storing program instructions executable on a computer system for performing a computer-implemented method for detecting defects on a wafer, wherein the computer-implemented method comprises:
determining characteristics of care areas for a wafer based on wafer patterns, wherein determining the characteristics comprises determining the care areas, identifying at least one pattern of interest in the wafer patterns for each of the care areas, allowing any of the care areas to have a free-form shape, selecting two or more patterns of interest for at least one of the care areas, and allowing any of the care areas to be larger than any frame image;
searching for patterns of interest in images generated for the wafer using an inspection system; and
detecting defects on the wafer by determining positions of the care areas in the images and applying one or more defect detection methods to the images based on the positions of the care areas in the images.

18. A system configured to detect defects on a wafer, comprising:
an inspection subsystem configured to generate images for a wafer; and
a computer system configured for:
determining characteristics of care areas for the wafer based on wafer patterns, wherein determining the characteristics comprises determining the care areas, identifying at least one pattern of interest in the wafer patterns for each of the care areas, allowing any of the care areas to have a free-form shape, selecting two or more patterns of interest for at least one of the care areas, and allowing any of the care areas to be larger than any frame image;
searching for patterns of interest in the images generated for the wafer; and
detecting defects on the wafer by determining positions of the care areas in the images and applying one or more defect detection methods to the images based on the positions of the care areas in the images.

19. The system of claim 18, wherein the free-form shape of one of the care areas is substantially the same as a shape of the wafer patterns included in the one of the care areas.

20. The system of claim 18, wherein the free-form shape is not a rectangular shape.

21. The system of claim 18, wherein determining the characteristics of the care areas for the wafer based on the wafer patterns comprises determining the characteristics of the care areas based on images of the wafer patterns acquired by imaging the wafer or another wafer with the inspection subsystem.

22. The system of claim 18, wherein determining the characteristics further comprises storing one or more images of each of the at least one pattern of interest, and wherein determining the positions of the care areas in the images for the wafer comprises determining a position of each of the at least one pattern of interest in the images for the wafer.

23. The system of claim 18, wherein said determining the characteristics further comprises identifying a position of each of the at least one pattern of interest with respect to its corresponding care area.

24. The system of claim 18, wherein each of the at least one pattern of interest is associated with only one of the care areas.

25. The system of claim 18, wherein identifying the at least one pattern of interest comprises identifying one or more patterns of interest that are unique within a portion of the images corresponding to their respective care areas.

26. The system of claim 18, wherein identifying the at least one pattern of interest comprises identifying one or more patterns of interest that are unique from each other.

27. The system of claim 18, wherein identifying the at least one pattern of interest comprises identifying one or more patterns of interest that are asymmetric.

28. The system of claim 18, wherein said identifying the at least one pattern of interest comprises selecting the two or more patterns of interest for the at least one of the care areas such that each of the two or more patterns of interest can be used independently of each other to determine the position of the at least one of the care areas in the images.

29. The system of claim 18, wherein the two or more patterns of interest selected for the at least one of the care areas are selected such that when the at least one of the care areas spans two or more of the images for the wafer, at least one of the two or more patterns of interest is present in each of the two or more images.

30. The system of claim 29, wherein when the at least one of the care areas spans the two or more images, determining the positions of the care areas comprises determining a position of a first portion of the at least one of the care areas in a first of the two or more images based on any of the two or more patterns of interest located in the first of the two or more images and determining a position of a second portion of the at least one of the care areas in a second of the two or more images based on any of the two or more patterns of interest located in the second of the two or more images.

31. The system of claim 29, wherein when the at least one of the care areas spans the two or more images, the at least one of the care areas is split across the two or more images in an x-direction on the wafer, a y-direction on the wafer, or x- and y-directions on the wafer.

32. The system of claim 18, wherein determining the positions of the care areas comprises identifying positions of the at least one pattern of interest in the images for the wafer and determining the positions of the care areas in the images for the wafer based on the positions of the at least one pattern of interest in the images for the wafer.

33. The system of claim 18, wherein determining the positions of the care areas comprises matching images of the at least one pattern of interest with the images for the wafer and, for the at least one of the care areas, identifying which of the two or more patterns of interest has a best result for said matching and determining the position of the at least one of the care areas with the pattern of interest having the best result.

* * * * *